United States Patent [19]

Olenfalk

[11] Patent Number: 4,479,426
[45] Date of Patent: Oct. 30, 1984

[54] METHOD OF CLOSING, COMPRESSING AND OPENING OF PRESSES FOR MEMBRANE FILTERS AND APPARATUS FOR CARRYING OUT THE METHOD

[75] Inventor: Lars Olenfalk, Järfälla, Sweden

[73] Assignee: Alfa-Laval AB, Tumba, Sweden

[21] Appl. No.: 438,312

[22] Filed: Nov. 1, 1982

[51] Int. Cl.³ .................... B30B 9/06; B30B 13/00
[52] U.S. Cl. .................... 100/37; 100/269 A; 100/219; 100/237; 100/195; 100/199; 100/204; 210/230
[58] Field of Search .................. 100/37, 269 A, 219, 100/DIG. 915, 237, 193, 194, 195, 199, 204, 220; 210/230, 227, 228, 229, 224; 269/189, 203, 22; 254/93 HP

[56] References Cited

U.S. PATENT DOCUMENTS

| 25,488 | 9/1859 | Clark | 100/237 X |
|---|---|---|---|
| 230,429 | 7/1880 | McGowan | 100/219 |
| 499,515 | 6/1893 | Burke | 210/227 |
| 749,140 | 1/1904 | Hack | 210/230 X |
| 2,500,791 | 3/1950 | Baldwin | 100/199 X |
| 3,565,398 | 2/1971 | Floria | 254/93 HP |
| 3,847,818 | 11/1974 | Madsen et al. | 210/321 |

FOREIGN PATENT DOCUMENTS

| 179263 | 12/1906 | Fed. Rep. of Germany | 100/269 A |
|---|---|---|---|
| 2802780 | 1/1978 | Fed. Rep. of Germany | |
| 2717048 | 9/1980 | Fed. Rep. of Germany | |
| 782131 | 3/1935 | France | |
| 22418 | 7/1912 | Norway | 100/193 |

Primary Examiner—Peter Feldman
Attorney, Agent, or Firm—Shapiro and Shapiro

[57] ABSTRACT

The invention relates to a method of closing, compressing and opening filter presses for membrane filters with a stationary upper yoke (7) and a lower yoke (6) movable on vertical press columns (2) and has for its object to improve the service and buildup of such membrane filter presses. This is achieved according to the invention by a method in which a loose lifting tool (10) is fitted under the movable yoke (6) and set in operation, whereby the yokes and the press plates situated therebetween are pressed against each other whereupon the movable yoke (6) is locked in the position taken and, upon opening of the press, is released whereupon the lifting tool is set out of operation and is removed.

An apparatus for carrying out the method is characterized in that, between the movable yoke (6) and an abutment (4) there is an interspace (14) in which a lifting tool (10) can be placed and set in operation or out of operation. On the columns between the yokes (6, 7) there is a fixable stopping means (15) with a shoulder (16) which can be placed under an arbitrary press plate (17) and retain it when the movable yoke (6) is lowered.

8 Claims, 4 Drawing Figures

METHOD OF CLOSING, COMPRESSING AND OPENING OF PRESSES FOR MEMBRANE FILTERS AND APPARATUS FOR CARRYING OUT THE METHOD

The invention relates to a method of closing, compressing and opening of presses for membrane filters, including a stationary upper yoke and a movable lower yoke on two or more vertical press columns, and press plates situated between the yokes and provided with filter sheets, and an apparatus for carrying out the method.

From German printed application No. 28 02 780 there is previously known an apparatus for reverse osmosis and ultrafiltration, comprising disc-like support plates and water guide plates stacked alternatingly on each other and clamped between two end plates, and annular membranes interposed between support plates and guide plates and supported with a filter layer, said membranes being fed with the non-purified liquid in the radial sense on the membrane side and drawing off the purified liquid, the permeate, on the filter side. The constructive measures proposed in this publication result in an improvement of the devices for desalting and purification of water previously known from e.g. U.S. Pat. No. 3,847,818, especially concerning exchange of membranes, avoidance of damages to membranes and an improved economy by re-use of membranes and relatively low manufacturing costs with a simple design.

However, practical use of the above-mentioned devices has shown that a number of problems still remain unsolved. The membrane exchanges have been simplified, it is true, but they are still complicated. If, for instance, a membrane in the standing filter stack has become damaged all the press plates situated above the actual filter membrane concerned, i.e. the support plates and guide plates, including the inserted filter layer and annular membranes, must be removed after the heavy yoke delimiting the stack upwardly has been lifted away. Especially the latter involves rather heavy lifts and time-consuming work with loosening and unscrewing of spindle nuts. The set-up of several press units also requires quite a lot of space and the pipe connections will be complicated. Moreover, each column must be adjusted separately into exact vertical position for which there are as a rule used three feet on each press of which two feet are made adjustable.

The object of the invention is to facilitate handling (manipulating) of such presses for membrane filters and simplify their construction and make them less expensive. Also the opening and closing of the press is to be simplified.

To attack and solve these problems the present invention proposes a method of closing, compressing and opening of presses for membrane filters, including a stationary upper yoke and a lower yoke movable along two or more vertical press columns, and press plates situated therebeween and provided with filter sheets, comprising fitting a loose lifting tool between the movable yoke and an abutment arranged opposite the side of said yoke facing away from the stationary yoke, setting the lifting tool in operation, whereby the yokes are pressed towards each other, and thereupon, i.e. after closing of the press, locking the movable lower yoke in its taken position, respectively releasing the movable yoke upon opening of the press and thereupon setting the lifting tool out of operation and removing it again.

In this way it is possible to use a very inexpensive compressing means for the press, which is very simple to operate and has the additional advantage that it can be used for a large number of successive presses, which strongly reduces necessary investments.

According to a very advantageous embodiment of this method a loose, elastic air bellows and compressed air as working medium is used as a lifting tool.

Locking of the movable yoke in the position taken as well as release thereof can be effected by respectively tightening and loosening of at least one screw means. Such a screw means may in a per se known manner comprise a spindle nut that can be screwed on to a threaded part of the associated press column. A comparable solution is to replace the rotary screw motion by a linear wedging motion by means of a wedge device and an inclined application surface or by means of at least one eccentric locking device.

To facilitate exchange of a certain, for instance damaged membrane in the membrane stack the invention also suggests retaining all the press plates situated above the damaged membrane, after compression by means of the lifting tool and the air bellows, respectively, by applying a suitable stopping means in the taken position and thereupon lowering the lifting tool again, while only the press plate with the damaged membrane and the press plates situated therebelow are released, whereby the damaged membrane will be accessible for being taken out sidewise and can be replaced by an undamaged membrane, whereupon the press is closed again, compressed and locked in the manner described above.

The invention also relates to an apparatus for carrying out the method of the invention.

According to the invention such an apparatus, including a stationary upper yoke and a movable lower yoke, press plates situated therebeween and provided with filter sheets and membranes, and vertical columns interconnecting the yokes, is characterized in that, opposite the side of the movable yoke facing away from the stationary yoke, there is arranged, with some interspace, an abutment which is fixedly connected to the lower ends of the columns, and that a lifting tool, preferably an air bellows, can be placed in the interspace, said bellows being connected to a compressed-air source with opening and closing means for the air bellows.

According to an advantageous embodiment of the apparatus the air bellows consists of a reinforced rubber bellows of substantially fixed diameter and variable vertical extent.

Another characteristic of an embodiment of the apparatus according to the invention is that each column is threaded immediately under the movable yoke and that a spindle nut is placed on this threaded part. Alternatively an eccentric locking device may be provided on one or more columns for locking the movable yoke in the position taken.

Another advantageous embodiment of the invention resides in that a stopping device can be fixed by wedging action or the like on that portion of the columns which is situated between the movable and the stationary yoke, and that each stopping device has a shoulder, a projection or the like which can be placed under an arbitrary press plate and retain it relative to the columns when the movable yoke is lowered.

A press unit has preferably only two columns, which permits lateral withdrawal not only of membranes but also entire press plates and thus makes it unnecessary to disassamble the upper stationary yoke and the plates lying above the actual membrane filter plate must not be lifted away upwardly one by one and be deposited outside the press.

As a press unit has only a limited filtration area, e.g. about 8 sq. m., while often several 100 sg. m. are needed the invention also suggests that, in setting up several such press units, their vertical columns should be mounted in parallel relationship in a frame beam or a frame beam module and that the entire frame beam or frame beam module or also several composite frame beam modules are adjustable in a horizontal plane as a single unit. This evidently simplifies the adjustment of the presses which must stand absolutely vertical to permit the individual disc filters to stand 100% horizontal and to load the membranes uniformly. This also facilitates the prefabrication of pipe connections and the drawing of pipe lines for supply and discharge of liquid, whereby time is saved and also the investments will be reduced and the construction will be simpler because there will not be any adjusting means for each individual press device.

The invention will now be explained in more detail with reference to an example of embodiment illustrated in the accompanying drawing, in which.

Figure 1:
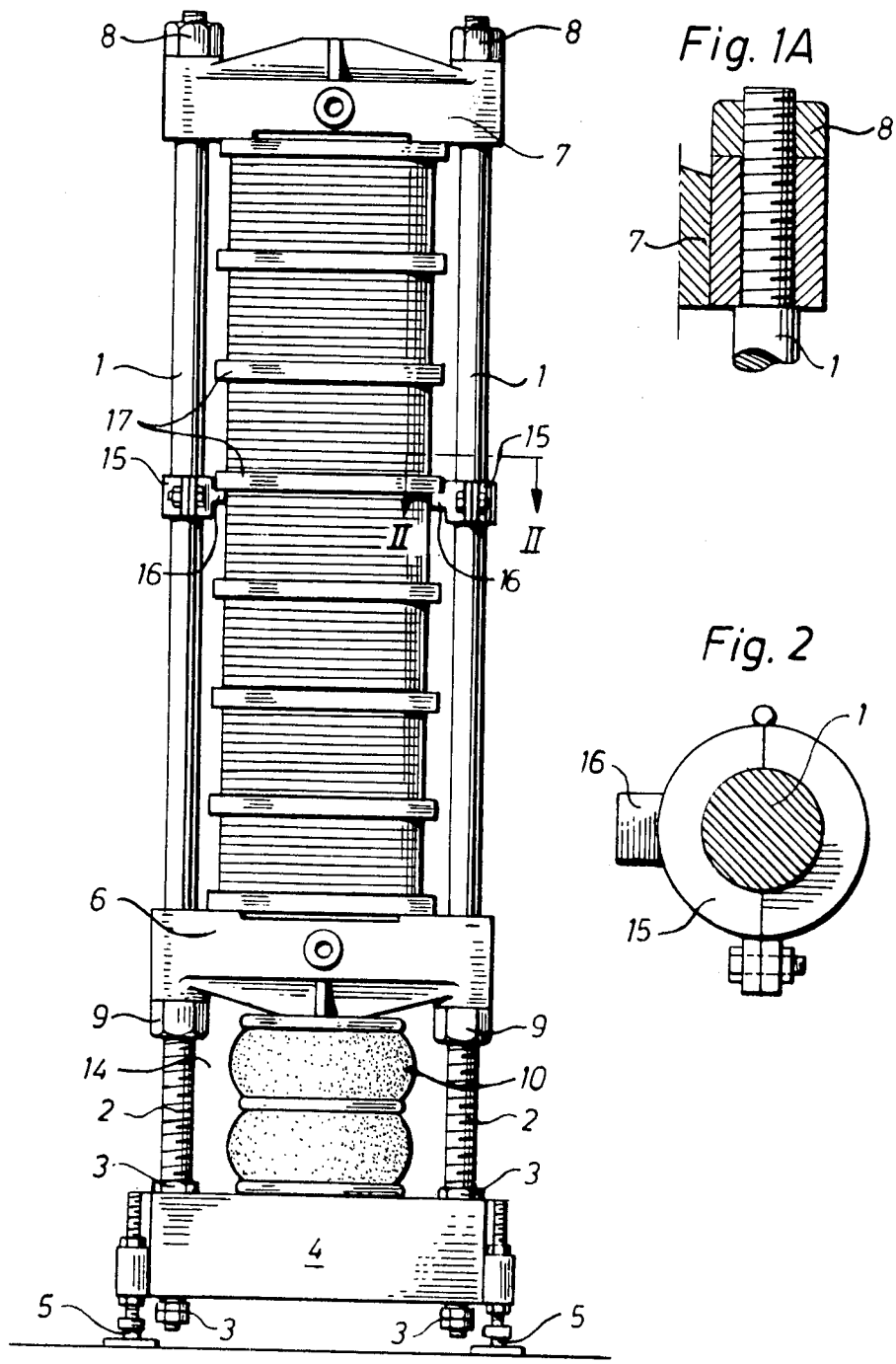
FIG. 1 shows schematically an individual press unit for carrying out the method according to the invention.

The press unit shown in FIG. 1 comprises in a per se known manner two vertical press columns 1, the lower part 2 of which is provided with a thread and which are secured by means of column nuts 3 in a frame beam module 4 with adjustable feet 5.

Figure 1A:
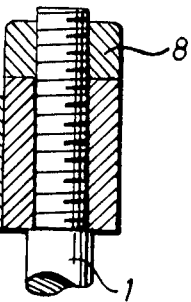
FIG. 1A shows details of a column and associated parts.

On the press columns 1 there is a movable lower yoke 6 and in the free end there is a stationary upper yoke 7, the latter being retained by means of column nuts 8 at the upper end of the columns 1; see the detail view in FIG. 1A. The movable yoke 6 can be retained from below by means of stop nuts 9 which engage with the thread on the lower threaded part 2 of the column 1.

An air bellows 10 is insertable between the movable yoke 6 and the frame beam 4, said bellows being connectible via a line 11 to a compressed-air source 12 with opening and shutting-off means 13. In the embodiment shown in FIG. 3 the compressed-air source consists of a foot pump but it can also be replaced by another suitable compressed-air source. The compressed-air bellows may suitably consist of a reinforced rubber bellows of substantially fixed diameter but variable longitudinal extent, which is controllable by means of compressed air.

Figure 2:
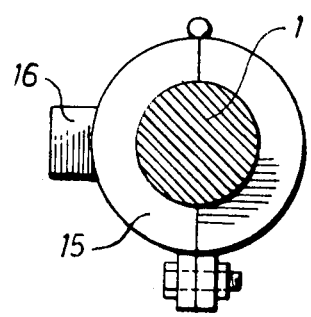
FIG. 2 shows a stopping means which can be fixed on some of the columns of the press.

In the embodiment according to FIG. 1 a stop means 15, which is fixable by wedging action and has a projection 16 directed inwards towards the filter plate stack, is fitted on that part of the columns 1 which is situated between the movable and the stationary yoke. FIG. 2 shows in horizontal section a conceivable embodiment of such a stop means. The projection 16 can be placed under an arbitrary press plate or a plate 17 downwardly delimiting a set of press plates and retains the same relative to the column when the moveable yoke 6 is lowered.

Figure 3:
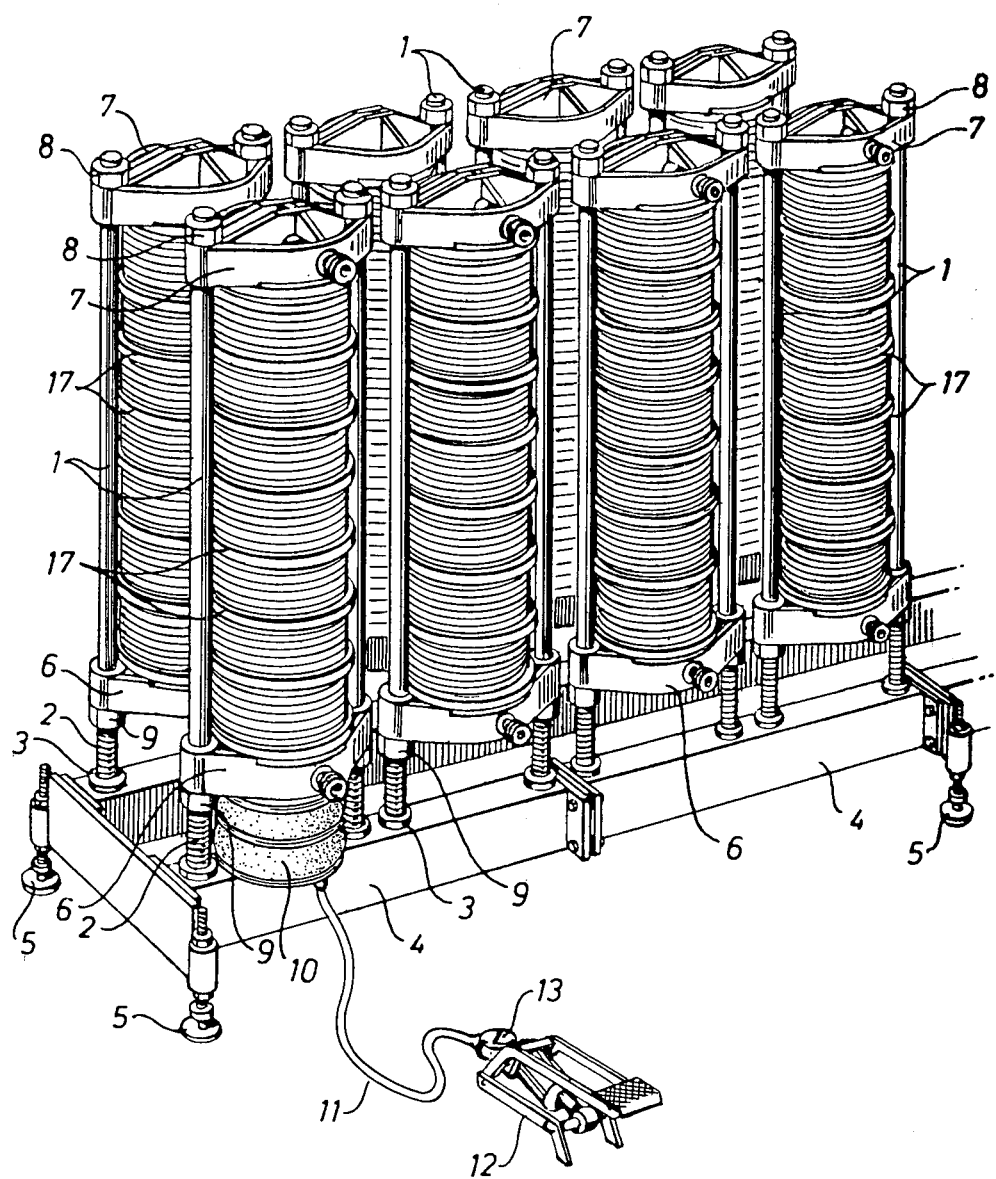
FIG. 3 is a schematical view of several press units set up in common.

As appears from FIG. 3 a plurality of press units can be set up adjacent each other without requiring much space, the columns 1 of said columns being mounted in parallel relationship in a frame beam module 4 or a frame beam composed of several frame beam modules. It will thereby no longer be neccessary to adjust the position of each individual press unit but it will be possible by means of the adjustable feet 5 to regulate individual module units with one press unit, individual module units with two press units or several screwed-together frame module units in a per se known manner which in this way will save time and be rational.

With reference to FIG. 1 the method according to the invention and the function of the apparatus proposed according to the invention will be described under the assumption that only the movable lower yoke 6 and the stationary upper yoke 7 are placed on the press-columns. In this position the press plates or sets of, say, ten press plates can be stacked upon each other on the lower movable yoke 6 until the interspace between the yokes is filled out. After that a lifting tool, in this case an air bellows 10 which is connected to compressed air, is placed in the interspace 14 between the movable yoke 6 and the frame beam 4, said compressed air increasing the length of the air bellows, thus pressing the movable yoke 6 upwards, whereupon the movable yoke is locked in its upper position by tightening of the stop nuts 9. Alternatively such locking can be effected by a wedging means or an eccentric means or in some other per se known manner which need not be described in more detail herein.

When the movable yoke has thus been locked in its upper position, the compressed air is released from the air bellows 10 which is taken out from the interspace 14 and can be placed in the next press unit and be used again. The press unit thus compressed is now ready for use for ultrafiltration, hyperfiltration, reverse osmosis, etc. until the membrane filter discs are clogged or their permeability has reached a minimum value determined in advance and these are to be cleaned. For this purpose the air bellows 10 is again inserted in the interspace 14, is filled with compressed air, whereupon the stop nuts 9 or a corresponding device is loosened and the movable yoke is let down. Starting from the top all the membrane filter plates or filter plate sets can be taken out one by one for cleaning.

If, however, an individual filter membrane has been damaged or if, for some other reason, only a certain membrane filter plate is to be inspected, cleaned or treated in another manner, the stopping means 15 with the projections 16 is placed under that plate 17 which is situated immediately above the plate concerned, as long as the air cushion 10 still is filled with compressed air and the stopping means is clamped on the columns 1. After that the stop nuts 9 are loosened, when required, and the compressed air is released from the air cushion so that all those plates situated under the plate retained by the projection 16 are lowered and the plate concerned 17 will thereby become accessible without it being necessary to remove any plates situated above it or even the stationary yoke.

As the press unit has been formed with only two columns 1 the withdrawal can easily be effected sidewise. Of course this is also possible when using three columns, but in that case there must be a larger distance between the columns and the centre of the press unit, whereby the apparatus will require more space.

Another advantage simultaneously achieved with the embodiment according to the invention is that the drawing of pipes to the various units is considerably simplified, which also increases the surveyability and facilitates the cleaning work, sterilization, if required, etc. No heavy lifts are required since now it is only necessary to take out separate filter membrane plates each of which is fairly light.

What I claim and desire to secure by Letters Patent is:

1. A method of manipulating filtering apparatus that includes at least two filter assemblies, each of which has two or more vertical columns, extending from a frame member, a stationary upper yoke spanning said columns, a movable lower yoke slidable along and lockable relative to said columns, and several membrane filters with intermediate press plates stacked and compressed between said yokes, said method comprising placing a separate lifting tool common to said filter assemblies below the movable yoke of one of the assemblies, and between that yoke and a frame member of said one assembly, operating the lifting tool to contact the movable yoke of said one assembly, fastening a stopping member to each of the respective columns of said one assembly at a level such that a portion of the stopping member is situated just below an edge of a selected intermediate press plate in a position to support the latter together with all filter membranes and press plates resting thereon, unlocking the movable yoke of said one assembly, lowering that movable yoke together with the membrane filters and press plates situated between that yoke and said selected intermediate press plate, replacing one or more lowered membrane filters, lifting the movable yoke of said one assembly again together with the filter membranes and press plates resting thereon, and, after compression of all the membrane filters and press plates and locking of the movable yoke relative to the columns of said one assembly, releasing the movable yoke of said one assembly from the lifting pressure of the lifting tool, removing the lifting tool from its position below the movable yoke of said one assembly and, instead, placing the lifting tool below the movable yoke of another assembly to be manipulated in the above defined manner.

2. A method as claimed in claim 1, wherein a loose elastic air bellows is applied as said lifting tool and set in operation by supply of compressed air to the air bellows set out of operation by release of the compressed air.

3. Filtering apparatus comprising, in combination, at least two filter assemblies, each of which has two or more vertical columns extending from a frame member, a stationary upper yoke spanning said columns, a movable lower yoke slidable along and lockable relative to said columns, and several membrane filters with intermediate press plates stacked and compressed between said yokes, the filter apparatus also comprising a separate lifting tool common to said filter assemblies, a free space being left below each of said lower yokes between the yoke and the frame member of the corresponding assembly, said space being wide enough and available for the insertion of said lifting tool, said lifting tool being adapted to be supported by each frame member and to lift and lower the corresponding movable lower yoke together with any desired number of press plates and intermediate membrane filters thereon, stopping members arranged to be fastened to the columns of each assembly at any desired level between the yokes thereof, such that a portion of each stopping member is situated just below the edge of a press plate in order to support it together with all filter membranes and press plates resting thereon, when a movable lower yoke of an assembly is lowered by said lifting tool together with the rest of the filter membranes and press plates of that assembly.

4. Filtering apparatus according to claim 3, wherein both of the filter assemblies have a common frame member formed as a beam, on which said columns are standing in an upright position in a row along the beam.

5. Apparatus as claimed in claim 3, wherein the lifting tool comprises an air bellows which is variable in length and a compressed-air source with opening and closing means for the air bellows is provided.

6. Apparatus as claimed in claim 5, wherein the air bellows comprises of a reinforced rubber bellows of substantially fixed diameter and variable longitudinal extent.

7. Apparatus as claimed in claim 3, wherein each column is threaded at a port immediately under the movable yoke (9) and there is a spindle nut (9) on said threaded part.

8. Apparatus as claimed in claim 3, wherein each stopping member is adapted to be fixed by wedging action on the portion of the columns situated between the movable yoke and the stationary yoke, each stopping member having a shoulder adapted to be placed under an arbitrary press plate and retain it relative to the columns when the movable lower yoke is lowered.

* * * * *